(12) United States Patent
Yamana et al.

(10) Patent No.: US 7,431,651 B2
(45) Date of Patent: Oct. 7, 2008

(54) DATA PROCESSING METHOD

(75) Inventors: Yutaka Yamana, Tokyo (JP); Takafumi Kaya, Tokyo (JP); Akio Setsumasa, Tokyo (JP); Junichi Takeda, Tokyo (JP); Yasuhiro Takahashi, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 540 days.

(21) Appl. No.: 10/694,741

(22) Filed: Oct. 29, 2003

(65) Prior Publication Data

US 2004/0087372 A1 May 6, 2004

Related U.S. Application Data

(62) Division of application No. 09/660,334, filed on Sep. 12, 2000, now abandoned.

(30) Foreign Application Priority Data

| Sep. 14, 1999 | (JP) | ................................. 11-261013 |
| Nov. 9, 1999 | (JP) | ................................. 11-318131 |
| Apr. 14, 2000 | (JP) | ............................. 2000-113947 |

(51) Int. Cl.
*A63F 13/00* (2006.01)
*G06F 17/00* (2006.01)
*G06F 19/00* (2006.01)

(52) U.S. Cl. ........................... 463/42; 463/40; 709/203; 709/217; 709/219; 709/226; 370/229; 370/235

(58) Field of Classification Search ................ 709/203, 709/227, 228, 229, 219, 226; 463/40–42; 370/229, 225

See application file for complete search history.

(56) References Cited

U.S. PATENT DOCUMENTS

| 5,558,339 A | * | 9/1996 | Perlman | ....................... 463/42 |
| 5,586,257 A | * | 12/1996 | Perlman | ....................... 463/42 |
| 5,644,720 A | * | 7/1997 | Boll et al. | ................... 709/227 |
| 5,740,371 A | * | 4/1998 | Wallis | ........................ 709/229 |

(Continued)

FOREIGN PATENT DOCUMENTS

GB 2 325 543 A 11/1998

(Continued)

OTHER PUBLICATIONS

Shirmohammadi et al., "JETS: a Java-Enabled TeleCollarboration System," Multimedia Computing and Systems '97. Proceedings., IEEE International Conference.

*Primary Examiner*—John M Hotaling, II
*Assistant Examiner*—Meagan Thomasson
(74) *Attorney, Agent, or Firm*—Dickstein Shapiro LLP

(57) ABSTRACT

A data processing method is provided whereby, even if communication delay occurs between computer game devices connected through a communication network, data is processed practically simultaneously between the respective computer game devices. When a computer game contest is carried out through a network having communication delay, before the game is started, the delay times between the game devices are found and, using these, synchronization of the time counted by the individual game devices is obtained. Then, during the progress of the game, the operating data signal is processed after the lapse of the longest delay time of the delay times between the game devices measured beforehand after it is generated. In this way, the operating data signal can be processed simultaneously in a plurality of game devices.

4 Claims, 17 Drawing Sheets

U.S. PATENT DOCUMENTS

| | | |
|---|---|---|
| 5,762,552 A | 6/1998 | Vuong et al. |
| 5,828,843 A * | 10/1998 | Grimm et al. ............... 709/228 |
| 5,841,980 A * | 11/1998 | Waters et al. ............... 709/204 |
| 5,862,348 A * | 1/1999 | Pedersen ..................... 709/229 |
| 6,038,599 A * | 3/2000 | Black et al. ................. 709/223 |
| 6,155,926 A | 12/2000 | Miyamoto et al. |
| 6,173,322 B1 * | 1/2001 | Hu .............................. 709/224 |
| 6,343,987 B2 | 2/2002 | Hayama et al. |
| 6,352,479 B1 * | 3/2002 | Sparks, II .................... 463/42 |
| 6,475,089 B1 * | 11/2002 | Lee .............................. 463/40 |
| 6,530,840 B1 * | 3/2003 | Cuomo et al. ................. 463/42 |

FOREIGN PATENT DOCUMENTS

| | | |
|---|---|---|
| WO | WO 96 25989 A | 8/1996 |
| WO | WO 97/39811 | 10/1997 |
| WO | WO 99/19027 | 4/1999 |

\* cited by examiner

| Header Section 30 (Count Value, Number of Players) | Data Section 40 | | |
|---|---|---|---|
| | Operating Data of Player 1 | Operating Data of Player 2 | . . . |

|       | Sub 2A | Sub 2B | Sub 2C | Sub 2D | Main1 |
|-------|--------|--------|--------|--------|-------|
| Sub 2A | —     | 2 0    | 2 0    | 2 0    | 2 0   |
| Sub 2B | 3 0   | —      | 3 0    | 3 0    | 3 0   |
| Sub 2C | 1 5   | 1 5    | —      | 1 5    | 1 5   |
| Sub 2D | 5 0   | 5 0    | 5 0    | —      | 5 0   |

Read ↓

Write →

DATA PROCESSING METHOD

This application is a divisional of application Ser. No. 09/660,334 filed Sep. 12, 2000 now abandoned, which claims priority to Japanese Patent Application No. 11-261013 filed Sep. 14, 1999, Japanese Patent Application No. 11-318131, filed Nov. 9, 1999, and Japanese Patent Application No. 2000-113947, filed Apr. 14, 2000. The subject matters of these applications are hereby incorporated by reference.

BACKGROUND OF THE INVENTION

1. Field of the Invention

The present invention relates to a data processing method in a computer game device connected through a communication network and in particular relates to a data processing method for simultaneously processing in each device data that has been input from a single device.

2. Description of the Related Art

In recent years, computer game devices for domestic use having a communication function are becoming common. With such computer game devices, by connecting to one or more other computer game devices through a network such as the Internet, it is possible to enjoy computer game combats between players of mutually separated computer game devices.

However, when mutually separated computer game devices are connected through a network such as the Internet, there is the problem of communication delay. Specifically, in a given one computer game device, the operating data generated corresponding to a player operation (movement of a character and/or attacking action etc) is processed in this one computer game device and is also transmitted to another computer game device, where it is likewise processed. In this situation, the operating data is practically instantaneously processed in the one computer game device and is displayed on the screen corresponding thereto, but, in the case of the other computer game device, this operating data arrives only after a prescribed transmission time and is subsequently processed and the corresponding screen is displayed.

Thus, if communication delay occurs, since the processing time points of the same data are different in the respective computer game devices, the game does not proceed synchronously. Consequently, at a given time point the players of the respective game devices perform operations whilst viewing respectively different game screens, so the inconvenience is produced that the players experience a feeling of incongruity with regard to the operations of their opponent and furthermore the game results may be different on each computer device.

SUMMARY OF THE INVENTION

Consequently, an object of the present invention is to provide a data processing method whereby, even if communication delay occurs between a plurality of computer game devices connected through a network, data is processed practically simultaneously between the respective computer game devices.

In order to achieve the above object, according to the present invention, when a computer game contest is conducted through a network having a communication delay, the delay times between the devices are found before starting the game, and these are used to obtain synchronization of the times counted by the respective devices. Thus, during the progress of the game, the operating data signal is processed after the lapse of the delay time of greatest length of the delay times between the devices measured beforehand after it is generated. In this way, simultaneous processing of the operating signal can be achieved in the plurality of devices.

In order to achieve the above object, according to the present invention, for example, in a method of data processing between a plurality of computer game devices connected through a communication network, there is provided:

a method of data processing comprising:

a measurement step of measuring the delay time between the plurality of respective devices;

an acquisition step of acquiring the longest time of the measured delay times;

a synchronization step of synchronizing the time that is counted by the plurality of devices; and a processing step of processing data that is transmitted from the devices in the plurality of devices on the elapse of the longest time of the delay times from the time of this transmission.

Preferably, in the invention described above, the data comprises information regarding the time of transmission and, when the data is received, the processing step recognizes when the aforementioned longest time has elapsed, using the difference between the time when the data was transmitted and the time which it counts itself.

Further, preferably, according to the invention, the synchronization step comprises a transmission step of transmitting from one device of a plurality of devices to another device the count value of the one device; and a stopping step of temporarily stopping count incrementation in another device such that the difference of its own count value and the received count value becomes the delay time with respect to the one device.

DESCRIPTION OF THE PREFERRED EMBODIMENTS

Embodiments of the present invention are described below. However, the technical scope of the present invention is not restricted to these embodiments.

Figure 1:
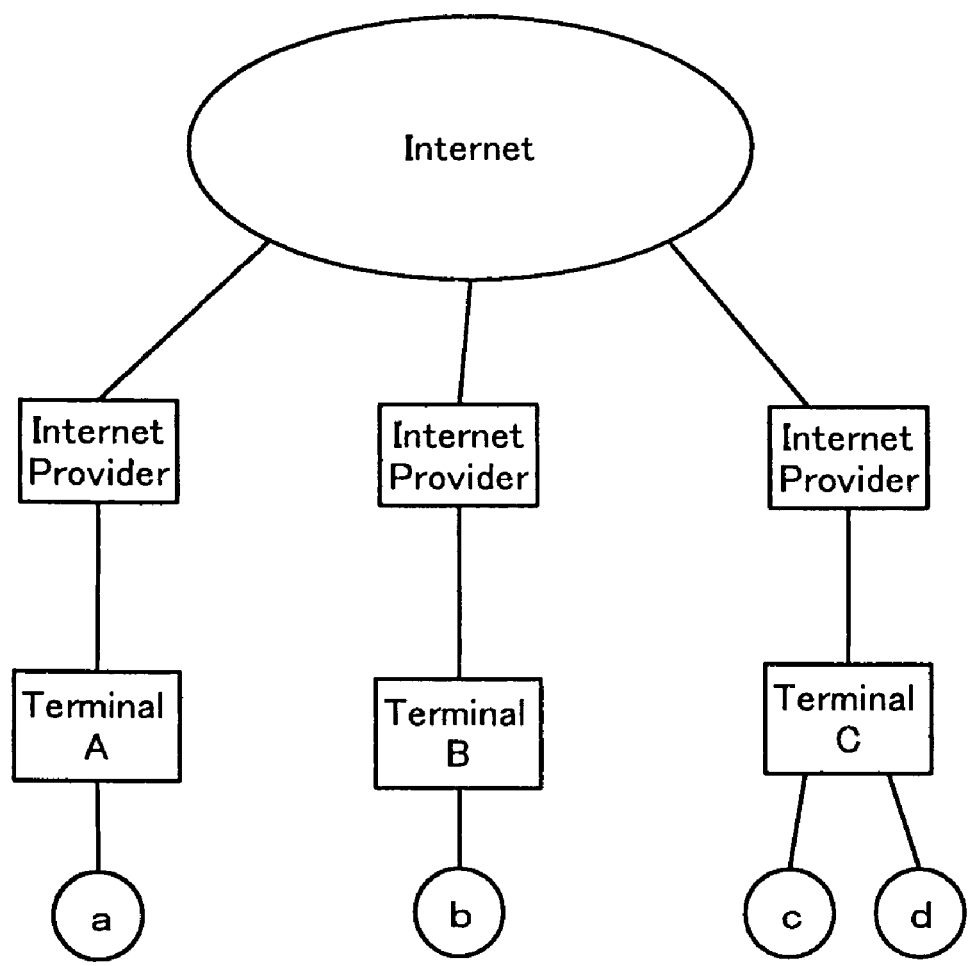
FIG. 1 is a schematic diagram of computer game devices connected through a network.

FIG. 1 is a schematic diagram of computer game devices connected through a network. In FIG. 1, computer game devices (hereinbelow called "game devices") A, B, C are connected to the other game devices through the Internet by connection to a server of the Internet provider. Also, player a operates game device A, player b operates game device B, and players c, d operate game device C. That is, game device C is operated by a plurality of players.

Figure 2:
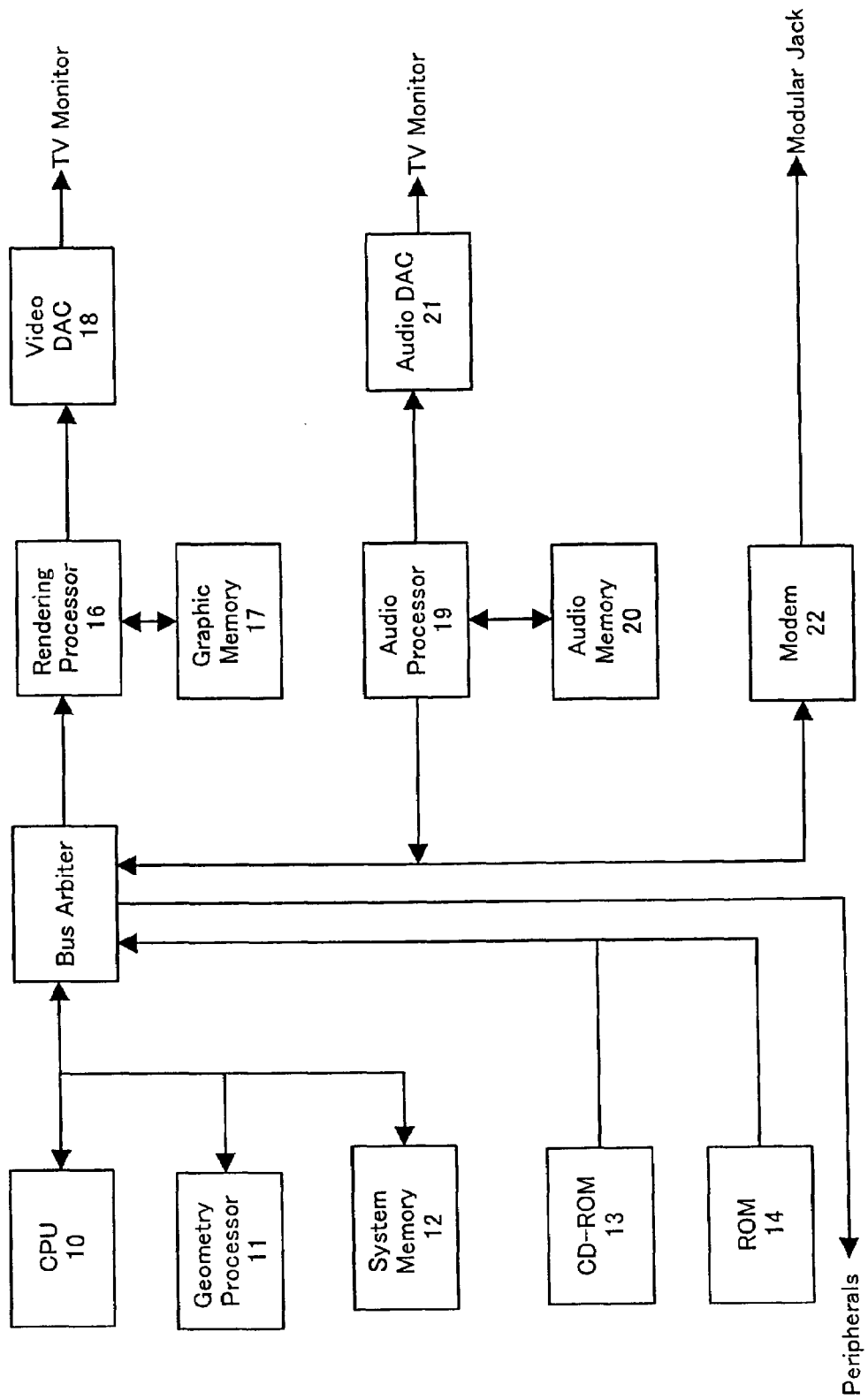
FIG. 2 is a block layout diagram of a computer game device.

FIG. 2 is a block diagram of a domestic computer game device having a communication function. In this game device, an image generated by computer graphics (CG) techniques is displayed on a monitor. In the CG technique, objects arranged in virtual three-dimensional space are constituted by a plurality of polygons, the polygons being constituted by a plurality of pixels. On the monitor there are displayed images, obtained by projection onto a two-dimensional plane, of the objects in each virtual three-dimensional space seen from prescribed viewpoint co-ordinates.

The game device therefore comprises: a CPU 10 that controls the entire system; a geometry processor 11 that performs geometric calculations; system memory 12 such as working RAM; a CD-ROM 13 constituting a storage medium on which the game program is stored; ROM 14 for initializing the game; a bus arbiter 15 that controls the bus; a rendering processor 16 that executes rendering; graphic memory 17; a video DAC 18 that performs a digital-analogue conversion of graphic data; an audio processor; audio memory 20; an audio DAC 21 that performs digital-analogue conversion on the audio data; and a modem 22 under the control of the bus arbiter. The game device is connected to the Internet through a communication circuit from modem 22.

Figure 3:
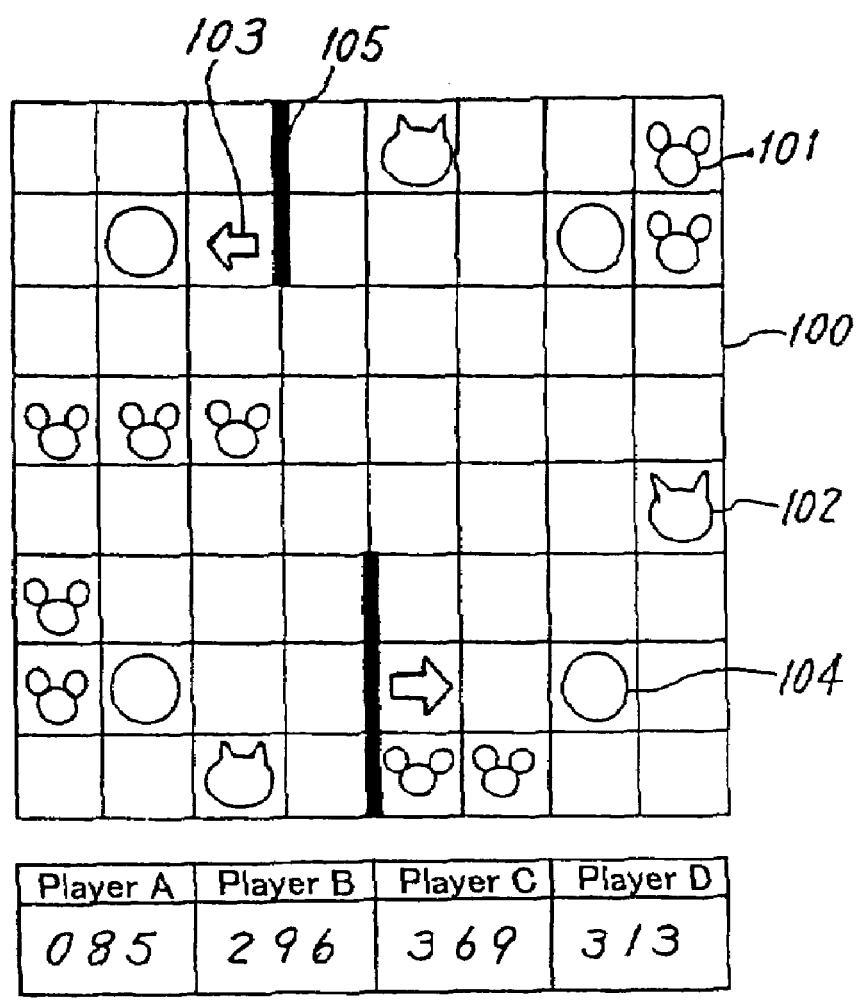
FIG. 3 is a view given in explanation of a computer game device illustrating by way of example an embodiment of the present invention.

FIG. 3 is a view given in explanation of a computer game shown by way of example in an embodiment of the present invention. In this embodiment, a large number of mouse characters 101 and cat characters 102 run around the squares defined on a board 100 on the screen. When the characters 101 or 102 collide with the corners or walls 105, their direction of advance is changed. When characters 101 or 102 collide with wall 105, their direction of advance is bent in one direction, for example the rightwards direction. Also, an arrow 103 can be placed in a square by an operation on the part of a player. When characters 101 or 102 arrive at the square of this arrow 103, their direction of advance is changed to the direction of the arrow.

A single square in which a hole 104 is set is allocated to a single player. A player competes to cause more mouse player characters 101 than the opposing players to fall into his own hole. For this purpose, a player performs an operation of placing arrows such as to guide mouse characters 101 into his own hole. For example up to three arrows may be placed by a single player. Consequently, when the fourth arrow is placed, the oldest arrow is deleted. A single stage is for example three minutes and the number of mouse characters 101 that have fallen into each player's hole 104 in this period is displayed as the score.

Also, in this game, if a cat character 102 falls into a hole, the number of mouse characters 101 that have already fallen into the hole is reduced in a prescribed ratio (for example reduced by two-thirds). Consequently, one tactic is for a player to place an arrow such as to guide a cat character 102 into an opposing player's hole.

In such a game, when a plurality of players are competing by means of a network, if there is communication delay as described above, the processing time-point corresponding to the operation of placing an arrow in a square by a given player will be different for each of the game devices, causing the positions of the characters running around on the screen on each game device to be different. If this happens, the games proceeding on each game device will become respectively different, so the result of the contest will also be different for each game device, thereby making it impossible to execute competitive games through the network.

Accordingly, an embodiment of the present invention proposes a method of data processing described below whereby the games proceeding on a plurality of game devices connected through a network having communication delay can be made to be identical. In the following description, as shown in FIG. 1, the case where a game is executed by connecting three game devices A, B and C through a network will be described. Also, the data processing method described below is provided by a game program stored on a recording medium 13 in FIG. 2 and executed by CPU 10.

Figure 4:
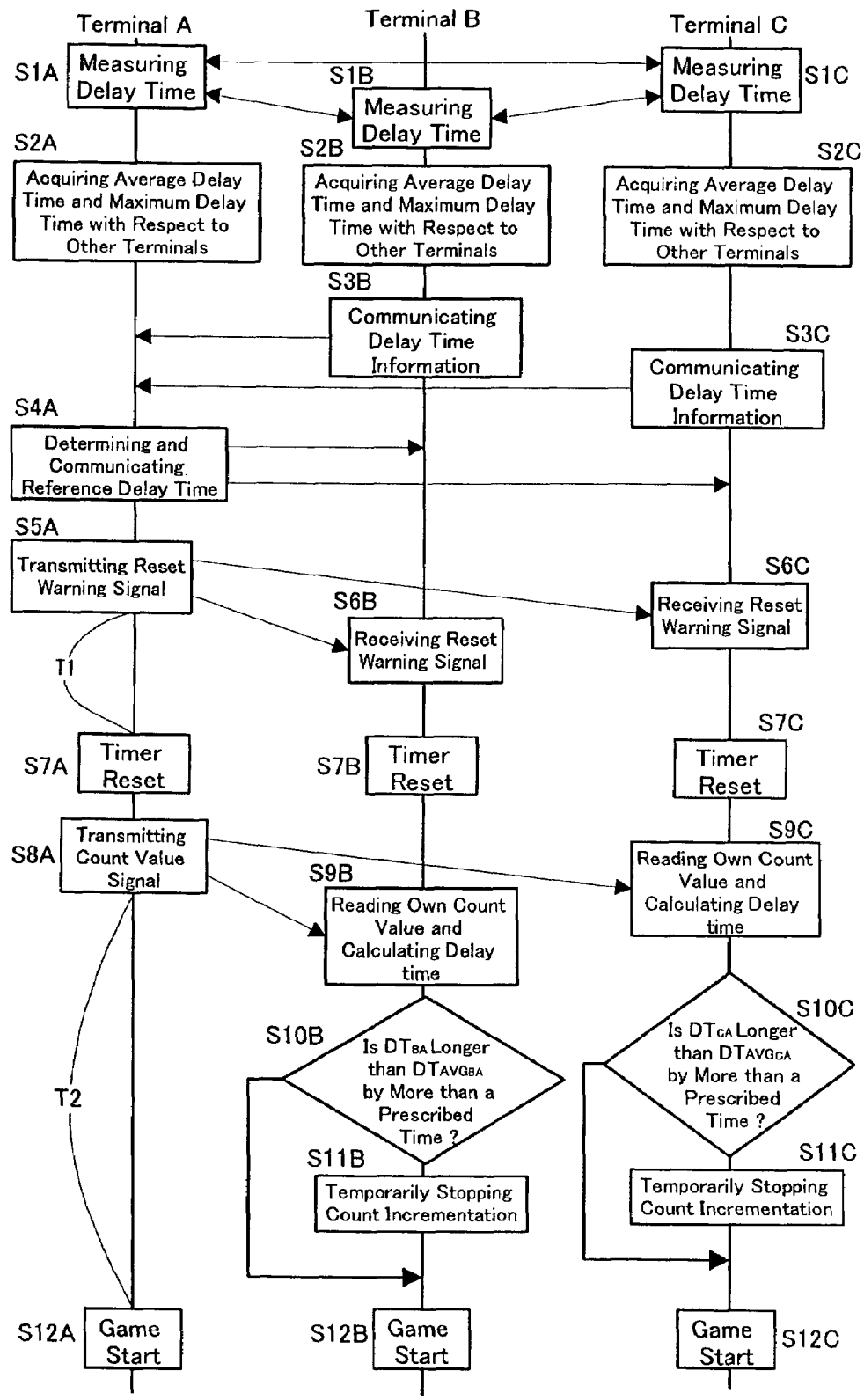
FIG. 4 is a processing flow chart of a data processing method according to an embodiment of the present invention.

FIG. 4 is a processing flow chart of a data processing method according to an embodiment of the present invention. First of all, before commencing the game, in steps S1A, S1B, and S1C, test data are sent between the game devices, to measure the delay time. For example, in step S1A, game device A sends test data with its own ID attached to game devices B, C respectively. When game devices B, C receive the test data from game device A, they send back test data to the originating game device A with their respective own IDs attached. Game device 8 can find the delay time between itself and at the other game devices B, C by measuring the time from the transmission of the test data until its return. The same measurement is performed in the game devices B, C (steps S1B, S1C). Each game device incorporates a timer that counts in units of 1/60 second (called 1 int), so the time can be measured using the count of the timer.

Also, the measurement is performed a plurality of times (for example 50 times) and each game device obtains the average delay time and maximum delay time between it and the other game devices (steps S2A, S2B, and S2C). Specifically, game device A obtains the average delay time and maximum delay time between it and game devices B, C, respectively (step S2A), game device B obtains the average delay time and maximum delay time between it and game devices A, C, respectively (step S2B), and game device C obtains the average delay time and maximum delay time between it and game devices A, B, respectively (step S2C).

Thus, the information of the average delay time Dtavg and the maximum delay time DTmax (hereinbelow called the delay time information) of the other game devices obtained by each game device is collected in a single game device. If for example the game device in which this delay time information is collected (hereinbelow called the representative game device) is taken as game device A, game devices B, C communicate their respective delay time information to representative device A (steps S3B, S3C).

Representative device A determines the longest maximum delay time of the delay time information that has been collected as the reference delay time DTref after commencing the game, and communicates this time DTref to the other game devices B and C (step S4A).

Next, representative device A sends to the other game devices B, C a reset warning signal to synchronize the count values of the timers of the respective game devices (step S5A). Next, representative device A, after the passage of a first time T1 (for example a few seconds) from the sending of the reset warning signal, resets the count value "0 (zero)" of the timers (step S7A).

For their part, the game devices B, C receive the reset warning signal from representative device A after the lapse of respective delay times $DT_{BA}$, $DT_{CA}$ (steps S6B, S6C). At this point, the game devices B, C assuming that the reset warning signal delay time is the maximum delay time $DTmax_{BA}$ or $DTmax_{CA}$ with the game device A respectively obtained in the above steps S2B, S2C, reset the count values of the respective timers to "0 (zero)" after the lapse of a time obtained by subtracting the respective average delay time with game device A from the first time T1 after receiving the reset warning signal (steps S7B, S7C).

Figures 5, 6:
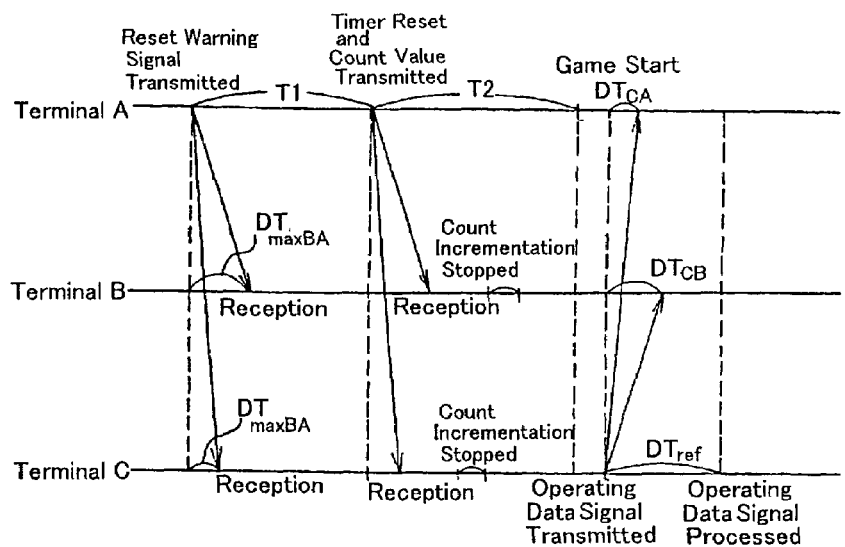
FIG. 5 is a timing chart given in explanation of a method of synchronizing the times of game devices A, B, C.
FIG. 6 is a view showing an example of the format of an operating data signal.

A more specific description will now be given with reference to FIG. 5. FIG. 5 is a timing chart given in explanation of the method of synchronizing the times of game devices A, B, C. For example, when game device B receives the reset warning signal, it identifies its delay time $DT_{BA}$ as the maximum delay time $DTmax_{BA}$ with game device A. Likewise, game device C identifies the delay time $DT_{CA}$ of the reset warning signal as the maximum delay time $DTmax_{CA}$ with game device A. Then, game device B resets its timer ( T1−$DTmax_{BA}$) seconds after it has received the reset warning signal. Likewise, game device C resets its timer ( T1−$DTmax_{CA}$) seconds after it has received the reset signal. In this way, the timers of game devices A, B, C are reset practically simultaneously to 0 (zero)", and new counts are commenced.

However, it is not essential that the actual delay time in each game device is the maximum delay time DTmax. Consequently, strictly, there exists the possibility that the reset timing of each game device may be considerably offset or the possibility that the times of each game device are not precisely synchronized. Accordingly, in this embodiment of the invention, the times of the game devices are synchronized even more precisely by the following adjustment processing performed after the lapse of a second time T2 (for example a few seconds) after reset.

Returning to FIG. 4, in step S8A, representative device A, simultaneously with reset, sends to the other game devices B, C a count value signal containing its current count value "0". Also, game device A may send a count value signal including the count value at a prescribed time-point after reset.

When game devices B, C receive the count value signal from game device A after the lapse of the respective delay times, they read the count value of their own timers when the count value signal was received (steps S9B, S9C). In addition, game devices B, C calculate the delay time with game device A by calculating (count value that is thus read-count value of count value signal).

Thus, as shown in FIG. 5, if for example the delay time $DT_{BA}$ calculated in game device B is longer than the average delay time $DTavg_{BA}$ with game device A by more than a prescribed time (for example 3 to 4 counts (3 to 4 int)) (step S10B of FIG. 4), game device B stops the count incrementation of the count value of the time for a period (delay time $DT_{BA}$−the average delay time $DTavg_{BA}$) (step S11B of FIG. 4). The same applies to game device C (steps S10C, S11C of FIG. 4).

In the above description, the time of reset of game devices B, C is ( T1−DTmax) after reception of the reset warning signal. Consequently, since game devices B, C are reset simultaneously with or before game device A, the count values of game devices B, C can be precisely synchronized with the count value of game device A by temporarily stopping count incrementation of game devices B, C, taking the count value of game device A as standard.

Thus, the times of the respective game devices are synchronized to some extent by timer reset in steps S7A, S7B and S7C. In order to synchronize the times of the game devices even more accurately, after reset, the game devices (B, C) other than the representative device compare their delay times with the average delay time by finding the delay time of the count value signal from representative device A with reference to the count value of their respective timers. If then the delay time that is thus found is larger by more than a prescribed time than the average delay time, count incrementation of the timers is stopped for a period corresponding to (delay time-average delay time), thereby correcting the count value; in this way, the times of the game devices A, B, C measured by the timers can be practically precisely synchronized.

Then, after the lapse of the second time T2, the game is simultaneously started in the respective game devices A, B, C (steps S12A, S12B, S12C). An operating data signal corresponding to a player operation in a given one game device (for example, the operation of placing an arrow in a prescribed square in the computer game of FIG. 3) is processed by the one game device and also transmitted to the other game devices and is processed in the other game devices too. In this process, as described above, the operating data signal must be simultaneously processed in the one game device and in the other game devices.

FIG. 6 is a view showing an example of the format of an operating data signal. As shown in FIG. 6, the operating data signal includes in the header section 30 count value information at the time of operating data transmission by the transmission-originating game device, and information as to the number of players operating the game device at the transmission end. Data section 40 is constituted by operating data for each player; the operating data includes for example cursor position information and/or arrow position information.

As shown in FIG. 1, with a computer game device according to this embodiment of the invention, a plurality of players on a single game device can participate in a combative computer game through a network (in FIG. 1, players c, d operate game device C). Consequently, the data section 40 of the operating data signal that is transmitted from the single game device contains operating data corresponding to the plurality of players, for each player. The data length of the operating data signal will therefore be different depending on the number of players operating the single game device. Also, the game device that receives the operating data signal recognizes the number of players operating the transmitting game device by referring to the number information of the players contained in the header section 30 and can thereby recognize the length of the following data section 40. In this case, the length of the operating data corresponding to one player is set to a constant length irrespective of the magnitude of the amount of data.

Figure 7A:
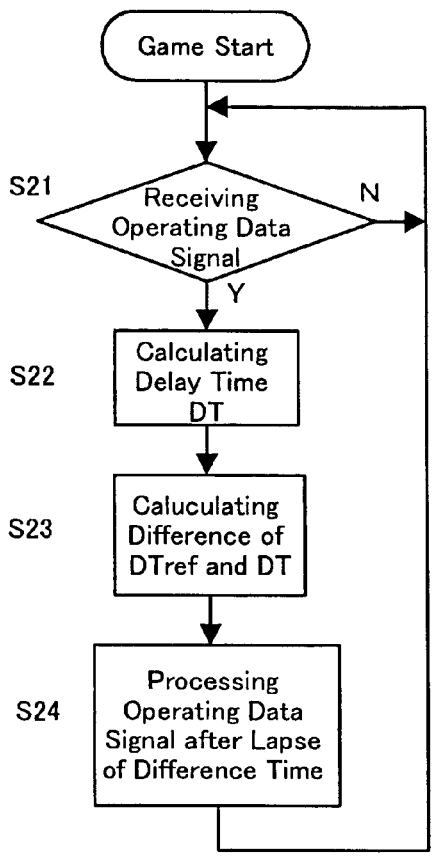
FIGS. 7A and 7B are a processing flow chart of game devices during conduct of a game.
Figure 7B:
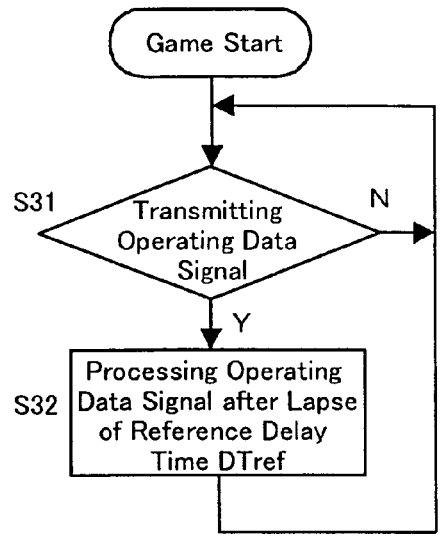

FIGS. 7A and 7B are processing flow charts of the game devices during the progress of a game. FIG. 7A shows the processing when the operating data signal is received and FIG. 7B shows the processing when the operating data signal is sent.

In FIG. 7A, at step S21, when the game device receives an operating data signal, in step S22, it compares the count value contained in the operating data signal and the count value of its own timer at the time-point of reception, and thereby calculates the delay time DT. Furthermore, in step S23, the game device calculates the difference time of the reference delay time DTref and the calculated delay time. Then, in step S24, the game device processes the operating data signal after the lapse of the difference time from when the operating data signal was received.

Also, in FIG. 7B in step S31, when the game device sends an operating data signal, in step S32, it processes the operating data signal after the lapse of reference delay time DTref.

Returning to FIG. 5, for example, the data processing in each game device of the operating data signal transmitted from game device C will be described. Game device C does not immediately process the transmitted operating data signal but only processes the operating data signal after the lapse of the reference delay time DTref from the time-point (count value) of transmission. In contrast, when game devices A, B receive the operating data signal from game device C, they read the count value at the time point of its reception, and calculate the respective delay times DT (count value on reception-count value contained in the operating data signal). Furthermore, game devices A, B respectively calculate the difference time of the reference delay time and the delay time DT found as referred to above (reference time DTref−DT). Then, they process the operating data signal after the lapse of the difference time which is thus found after reception of the operating data signal.

In this way, the operating data signal is processed in the game devices A, B, C after the lapse of the reference delay time DTstd from the time point of its transmission. Since the count values of the timers of game devices A, B, C are practically coincident due to the synchronization processing described above, the operating signal is processed simultaneously by all of the game devices A, B, C at once, after the passage of the prescribed reference delay time that has been set.

Since, as described above, the reference delay time is the longest time of the respective maximum delay times among the individual game devices, it can be arranged for the operating data signal to be received reliably by all the game devices, by having all the game devices suspend operation for the standard delay time from the time-point of transmission of a given operating data signal. Thus, since, according to the present invention, the same operating data signal is simultaneously processed by all of the game devices, processing of the operating data signal is suspended until all of the game devices have received the same operating data signal. In order to measure this suspension time, the times measured by the timers of the respective game devices are synchronized, and furthermore the standard time i.e. the reference delay time is set.

The mouse characters, cat characters, arrows, and also the background such as the board having squares which are displayed on the computer game screen shown in FIG. 3 are obtained by image processing as objects in three-dimensional virtual space.

Figure 8:
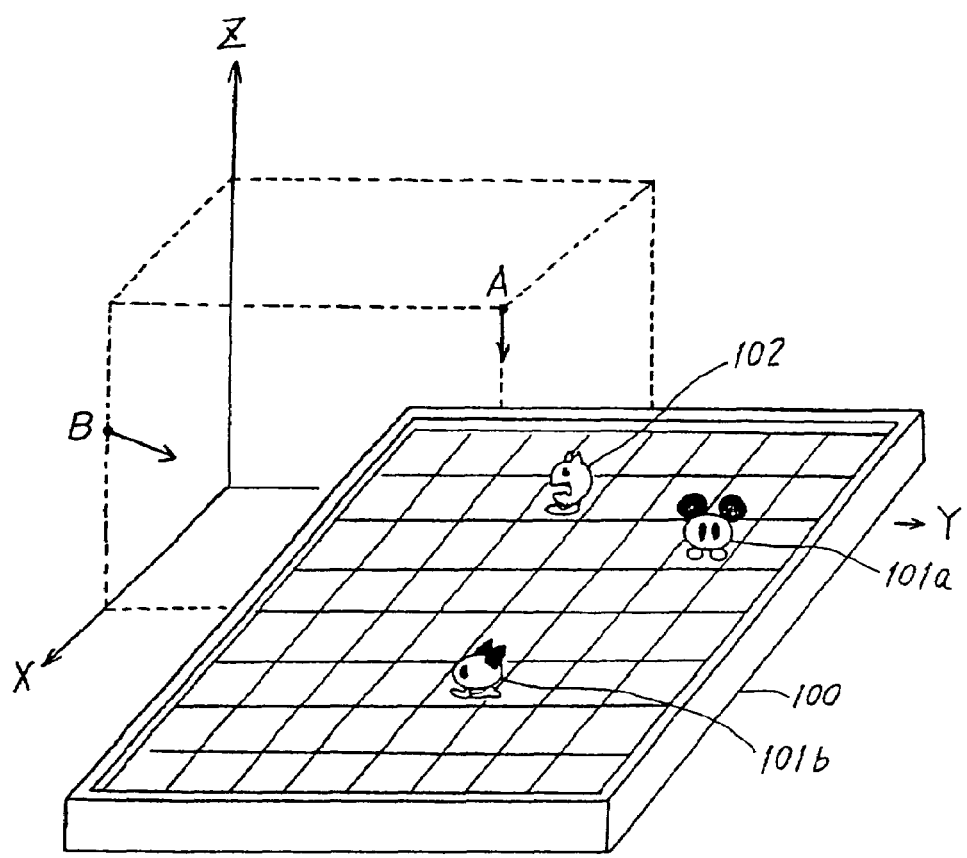
FIG. 8 is a view illustrating a three-dimensional virtual space in which the objects of a computer game are arranged according to an embodiment of the present invention.

FIG. 8 is a view showing the three-dimensional virtual space in which the objects of a computer game are arranged in the present embodiment of the invention. In FIG. 8, the objects of board 100 and mouse characters 110a, 101b and cat character 102 are arranged in three-dimensional virtual space. The mouse characters 110a, 101b and cat character 102 are given as objects respectively facing their direction of advance (front face direction) on board 100.

Figure 9A:
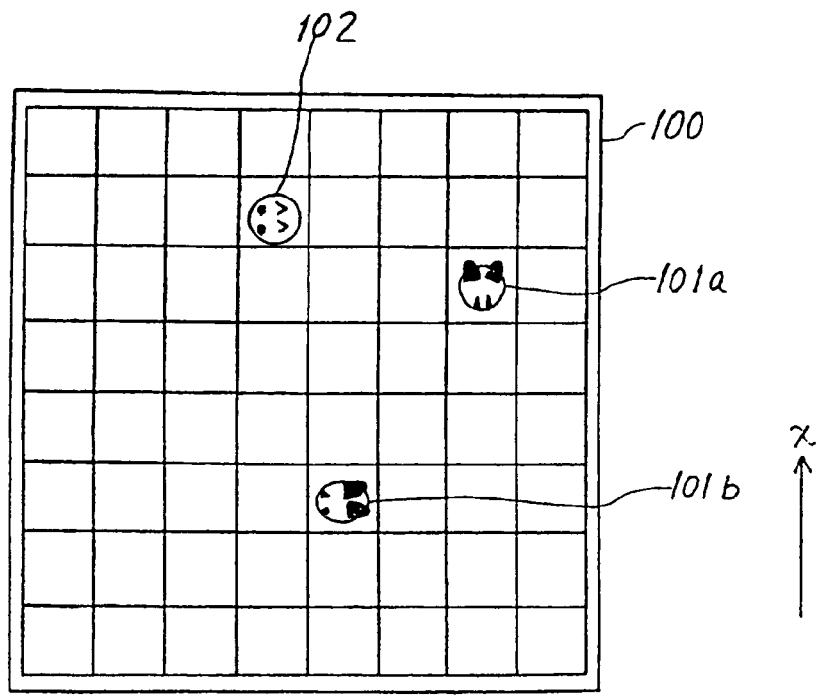
FIGS. 9A and 9B are a view showing an example of an image of the three-dimensional virtual space of FIG. 8 as seen from a prescribed viewpoint.
Figure 9B:
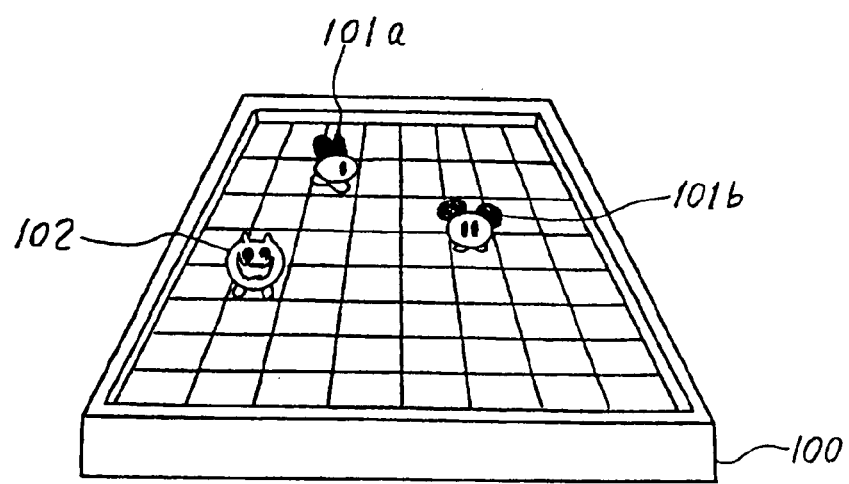

FIGS. 9A and 9B are views showing an example of the image resulting from viewing the three-dimensional virtual space of FIG. 8 from a prescribed viewpoint. In the case of the computer game of this embodiment, when the game is proceeding due to operation by the players, an image seen from the viewpoint of A of the three-dimensional virtual space i.e. an image seen from directly above board 100, as shown in FIG. 9A is displayed on the monitor. Also, in the demonstration prior to starting the game or between one stage and another stage in the game, an image viewed from viewpoint B i.e. an image seen from diagonally above the board as shown in FIG. 9B is displayed on the monitor.

An image as shown in FIG. 9A from directly above board 100 is an image in which the movement of the characters on the entire board is easiest for a player to view. Consequently, although this is ideal as an image during progress of the game, since only the heads of the mouse characters 110a, 101b and cat character 102 are displayed on board 100, it has the drawback that the shape of the form of the characters is difficult to comprehend.

Accordingly, in this embodiment of the present invention, when the image is displayed from a viewpoint directly above board 100 (viewpoint A of FIG. 8), the direction in which the characters face is inclined by a prescribed angle (for example 45°).

Figure 10E:
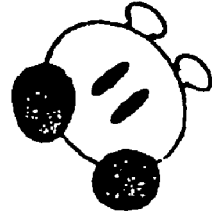
FIGS. 10A-10F are a view given in explanation of the direction of facing of the characters.
Figure 10F:
Figure 10C:
Figure 10D:
Figure 10A:
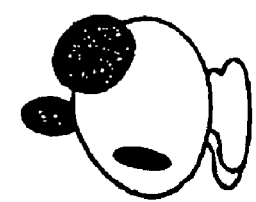
Figure 10B:
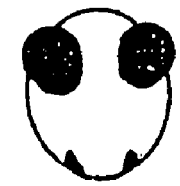

FIGS. 10A-10F are views given in explanation of the direction in which the characters face. Although a mouse character is shown by way of example, the cat character is inclined in the same way. FIG. 10A is a view of a mouse character seen from the side; the mouse character is facing forwards, which is the ordinary facing direction. A mouse character seen from the viewpoint A of FIG. 8 in this facing direction would appear as shown in FIG. 10B. FIG. 10C is a side view of a mouse character inclined in the forwards and upwards direction. When a mouse character in this facing direction is viewed from viewpoint A of FIG. 8, it appears as shown in FIG. 10D. Compared with FIG. 10B, it is clear that the overall image of the mouse character is represented in a manner which is easier to understand. Also, FIG. 10E is a view of the mouse character seen from the front when the mouse character is inclined in the lateral direction. When a mouse character facing in this direction is viewed from viewpoint A in FIG. 8, it appears as shown in FIG. 10F. Comparing this with FIG. 10B, it is clear that the overall image of the mouse character is represented in a manner which is easier to understand.

In this embodiment of the present invention, as described above, when the viewpoint is directly above the character, the character is inclined at a prescribed angle in a prescribed direction. In this way, even during the game, the shape of the form of the character can be displayed in a manner which is easy to understand. Also, the direction of inclination may be fixed in one direction irrespective of the movement of the character. For example, in FIG. 9A, the characters are inclined in the upwards direction (direction of arrow X) in the plane of the drawing. In this way, the mouse character 101a is inclined in the forwards and upwards direction as shown in FIG. 10C, and so is displayed as shown in FIG. 10D. Also, the mouse character 101b is inclined in the lateral direction as shown in FIG. 10E (left-hand direction in FIG. 10E), and so is displayed as shown in FIG. 10F.

In this way, in this embodiment of the present invention, the direction in which the object faces changes in accordance with the position of the viewpoint co-ordinates in the three-dimensional virtual space. In this way, objects (characters) displayed on the game screen can be displayed in a manner which is easier to understand.

Further Embodiment

Before commencing a network combat game as described above, it is necessary that the game devices A, B, C of FIG. 1 should mutually recognize the game devices of the opposing combatants. In order to achieve this, before commencing the game, the players first of all connect the game devices, constituting the clients in the network system, to the server (hereinbelow called the "network server") that manages the network combat game, to register them on the network server. A combat group is thereby constituted. Thus, players wishing to play a network combat game first of all make connection with the network server.

Figure 11:
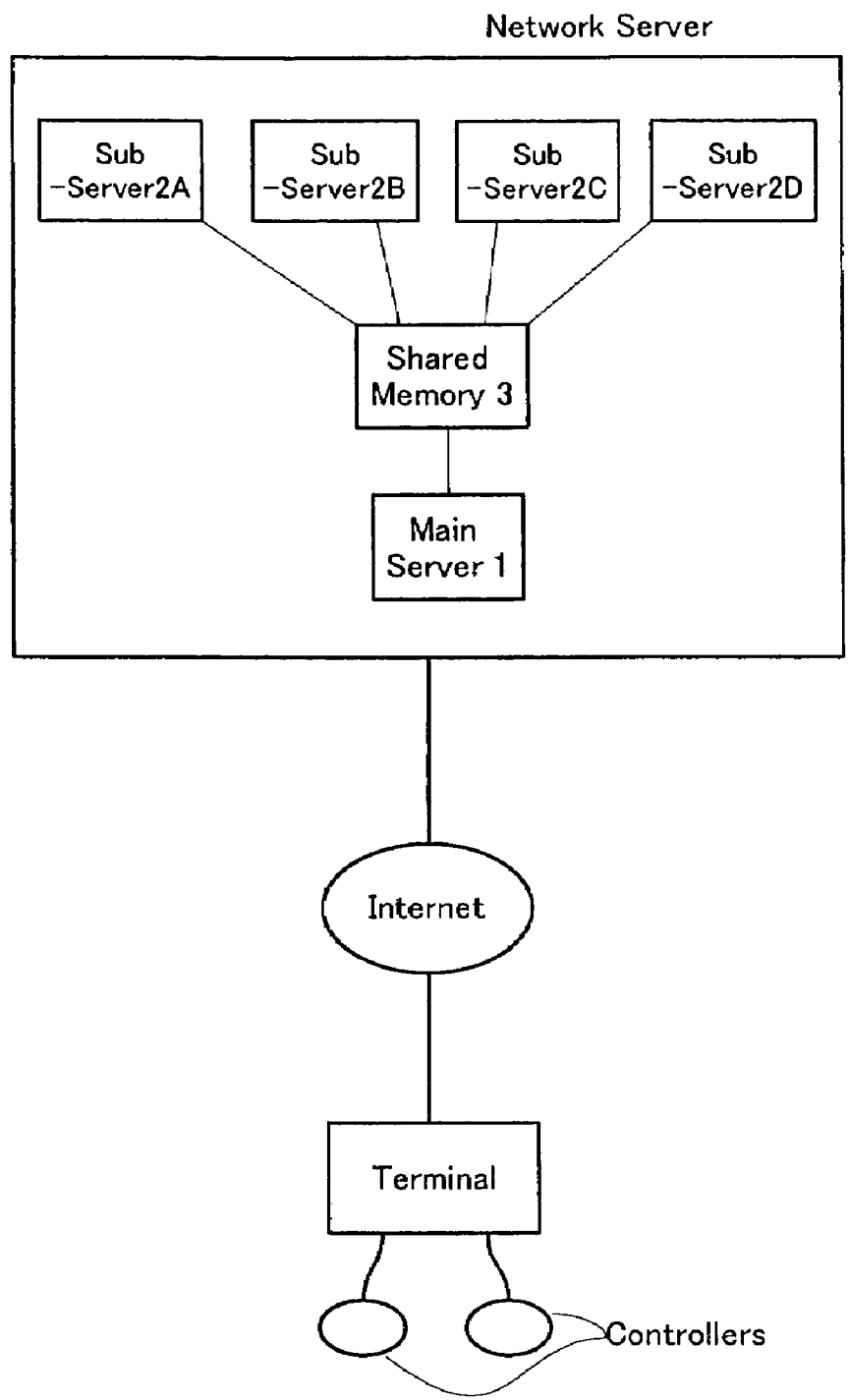
FIG. 11 is a block layout diagram of a network server according to an embodiment of the present invention.
Figure 12:
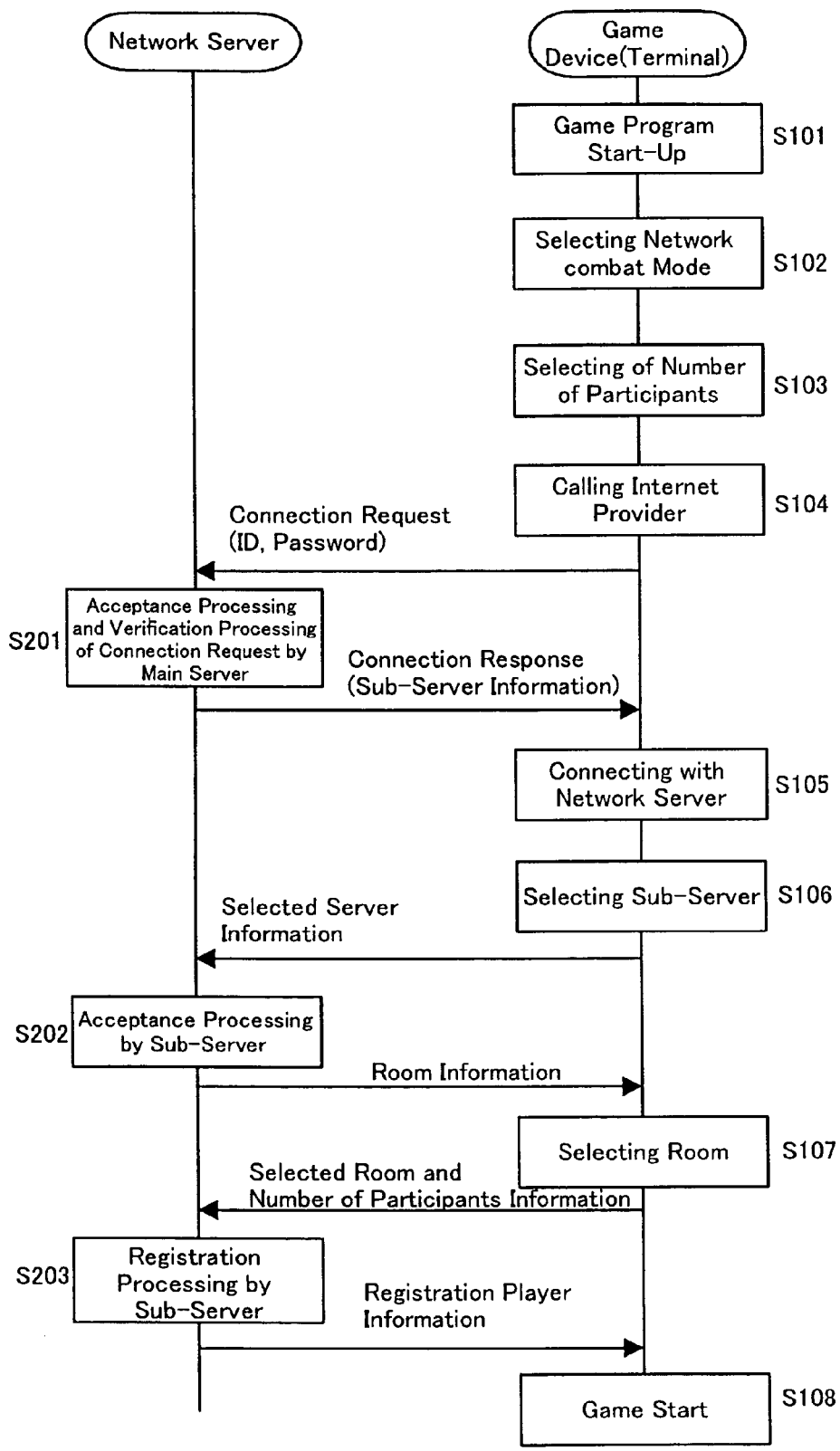
FIG. 12 is a flow chart of the registration procedure onto a network server in a game device.
Figure 13:
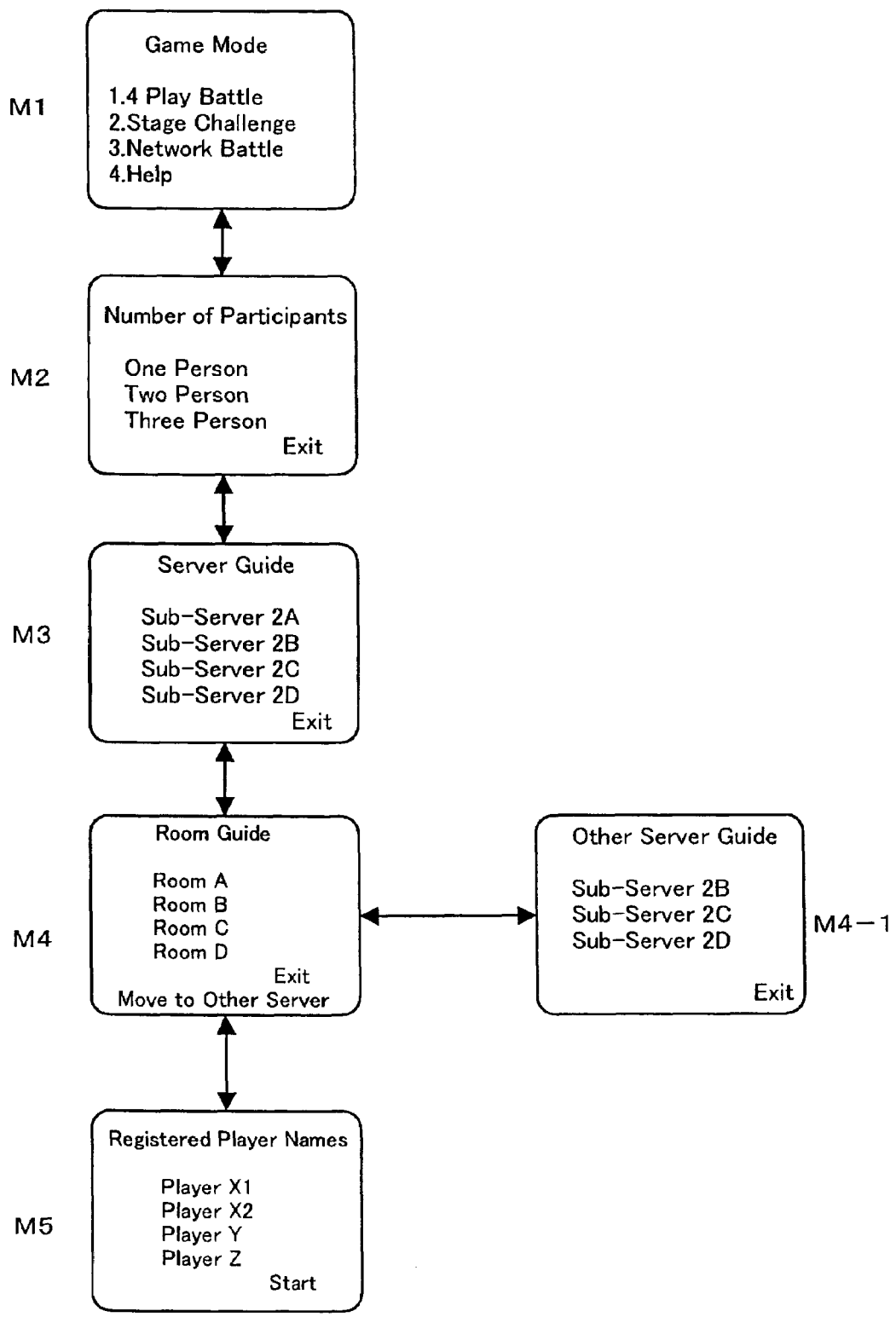
FIG. 13 is a view showing an example of a display screen on a game device in the procedures of FIG. 12.

FIG. 11 is a block layout diagram of a network server in an embodiment of the present invention. In FIG. 11, the network server comprises a main server 1, a plurality of sub-servers 2a, 2b, 2c and 2d and shared memory 3. Also, FIG. 12 is a flow chart of the registration procedure with the network server in a game device and FIG. 13 is a view showing an example of the display screen on the game device in each procedure. FIG. 12 will be described with reference to FIG. 11 and FIG. 13.

First of all, in step S101, the player sets the recording medium (for example CD-ROM) on which the computer game program is stored in position in the game device, and starts up the computer game program. When the game program is started up, first of all, the game mode selection screen M1 of FIG. 13 is displayed. On the game mode selection screen, there are displayed for example the "4 Players Battle", which is a combat within the game device, the "Stage Challenge", in which the desired stage of combat can be selected, and the "Network Battle", which is a network combat mode. The player selects "Network Battle" by operating the controller (step S102).

When Network Battle mode is selected, a selection screen M2 (FIG. 13) for selection of the number of participants in the Network Battle is displayed. The player selects the number of participants by operating the controller (step S103). A plurality of controllers (for example four) for operation by the players can be connected to a game device. Consequently, the case may be envisaged where a plurality of players participate in a network combat game from a single game device.

Conventionally, in a combat game that is played in a game device without going through the network, a plurality of players can participate in combat by utilizing a plurality of controllers connected to a single game device. On the other hand, on the network, the network server is unable to identify the number of controllers (or number of players) connected thereto simply by identifying the number of game devices connected to it.

Specifically, conventionally, in a combat game that does not go through the network, a single connection is created between a single game device and the network server, and the network server cannot identify the number of controllers or players connected to the game device. Consequently, only a single player could participate in a combat game through the network from a single game device.

Accordingly, in the present embodiment of the invention, the number of players participating in a network combat game from a single game device is notified beforehand to the network server. In this way, even though there is the only one connection between a single game device and the network server, the network server can recognize the number of players participating from a single game device and so can make possible the participation of a plurality of players in a network combat game from a single game device. It should be noted that selection of the number of participants is not restricted to being performed in step S103 above, but could be performed in any step up to notification of the number of participants to the network server.

When the number of participants is selected, the game device calls the Internet provider through the modem (step S104), and communicates a request for connection to the network server through the Internet provider. The connection request includes the identification information of a single player such as the player ID and password. If the Internet is utilized using the TCP/IP protocol, the remote party of the connection can be specified by specifying the IP address and port number. First of all, the game device connects to the main server 1 of the network server by specifying the IP address and port number of main server 1. The IP address and port number of the main server 1 are stored beforehand in the game device. In this case, the IP address identifies the network server, and the port number identifies individual servers therein. In FIG. 11, the main server and sub-servers are shown as divided by software within a single network server. If the main server and sub-servers are separate systems, they are given respective separate IP addresses.

Figure 14:
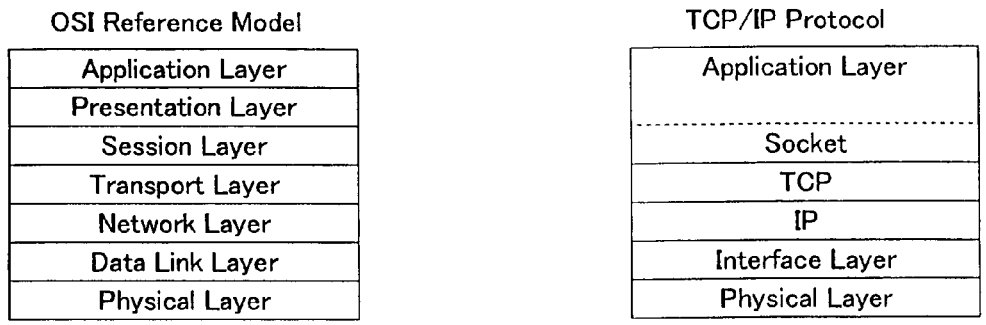
FIG. 14 is a diagram showing the TCP/IP protocol layers.

A brief explanation of TCP/IP will now be given. FIG. 14 is a view showing the layers of the TCP/IP protocol. In FIG. 14, the TCP/IP protocol is of a 5-layer structure. In comparison with the OSI reference model, TCP is a protocol that provides a data link of the connection type, and corresponds to a transport layer constituting a stream-type interface with respect to an upper-layer application, and establishing connection between separated processes on the network. Also, IP corresponds to the network layer whereby data is transferred on the network, two points on the network whereby data is transferred being represented by IP addresses. The TCP upper layer is the application layer and the IP layer is the interface layer and physical layer. As the lower layer, the Internet or FDDI etc are known.

Also, a socket included in the application layer of the TCP/IP protocol is an application programming interface (API) for creating applications to perform data exchange by communication between processes on the TCP; in more detail, it corresponds to the session layer in the OSI reference model. A socket provides an environment whereby process users can treat communication between processes in the same way as file input/output, without being conscious of the environment (system or network etc). Accordingly, two connected processes (in this embodiment, the game device and network server) create sockets (communication input/output ports) and data signals are exchanged between the sockets.

Returning to FIG. 12, a connection request from a game device is subjected to acceptance processing by the main server 1 in the network server and, in addition, is subjected to recognition processing (step S201). Thus, the main server 1 is a server which executes acceptance processing and validation processing in respect of a connection request from a game device. When it receives a connection request, the main server 1 executes validation processing in accordance with user information registered beforehand therein and identification information that is notified thereto. If it recognizes that a player is genuine, the main server 1 sends a connection response to the game device and notifies the sub-server 2 of the information. The connection between the game device and the network server is thereby established (step S105).

The information of the sub-server 2 comprises for example the name of each sub-server 2, the IP address, port number and information as to the number of persons currently registered. The information as to the number of persons currently registered, as will be described, is stored in a shared memory 3. Main server 1 reads the information as to the number of persons currently registered of each sub-server 2 from shared memory 3. The sub-server 2 is a server for managing the network combat game that is currently being played; the combat group is formed by registering the players with the sub-server.

On connection with the network server, the server guide screen M3 is displayed on the game device. The names of the sub-servers 2 are displayed on screen M3. A player (when there are a plurality of participants, one of the plurality of players) selects a sub-server by operating the controller (step S106). The number of players that can be registered on a single sub-server is determined in accordance with the details of the server. Consequently, if a sub-server 2 on which the maximum number of persons has already been registered is selected, a message to the effect that the server cannot be selected is displayed. Also, a player, by operating the controller, can cause the number of persons currently registered on each sub-server, or connection feasibility information based on this, to be displayed.

When a sub-server 2 is selected, the main server 1 changes over the connection with the game device to the selected sub-server 2 (step S202). Specifically, main server 1, when the sub-server that has been selected is notified from the game device, communicates the IP address and port number of the selected sub-server 2 to the game device.

Also, when a sub-server is selected, a connection request is communicated to the selected sub-server, using the IP address and port number of the selected sub-server. The selected sub-server, when it performs acceptance processing of this connection request (step S202), notifies the game device of the information of a plurality of registration regions (hereinbelow called "rooms") defined within the selected sub-server 2. For example, if the maximum number of combatants for a network combat game is four, the sub-server 2 will have prepared a plurality of rooms for registration of groups of four players. A room guide screen M4 (FIG. 13) is displayed on the game device. This information may be included in the sub-server information that is communicated from the main server 1. In this case, there is no need for the connection request to the sub-server to be made when the sub-server is selected.

The player selects a room by operating the controller (step S107). When a room is selected, the selected room and the number of participants are communicated to the selected sub-server from the game device. The selected sub-server then registers (step S203) players, to the number of participants, in the notified room. The selected sub-server notifies the game device of the player information registered in the selected room. The registered player information comprises for example the names of the players, and the IP address and port number of the game devices of each player. In this way, the game devices acquire the IP addresses and port numbers of the game devices of their opponents.

The information of the players registered in the selected room is displayed on screen M5 (FIG. 13). On the screen M5 of FIG. 13, for example if two players are participating from a single game device, player X1 and player X2 are displayed as the players' names. This is because the network server only registers the identification information of a single player in respect of a single game device. The game is then started (step S108) by selection of the start button of screen M5 by one of the players registered for the selected room operating the controller.

It should be noted that it will not be possible for a player to be registered in a selected room if for example the maximum number of combatants (for example four persons) is already registered in the selected room, or if, the number of participants being two, the maximum number of combatants is exceeded if two persons register, or if a game has already begun. By operating the controller, a player can cause the number of persons who are already registered or the condition of each room, for example as to whether a game is in progress there or not, to be displayed.

Also, the rooms of the sub-servers 2 may have a multi-layer arrangement. For example, where a sub-server is a server that manages network combat games of a plurality of types or that manages chat rooms etc, it may be provided with large rooms for each type of game and large rooms to serve as chat rooms, a plurality of small rooms being set up under the large rooms.

Also, on the above screens M2-M5, there is displayed an item "exit". By selecting this, it is possible to return to the previous screen. Consequently, if "exit" is selected, if the sub-server rooms are in a multi-layer arrangement, it is possible to return to the single upper layer. Also, in screen M4, if "exit" is selected, screen M3 is restored i.e. the game device is again connected with the main server 1. A player may change the sub-server in which he/she is registered if for example a remote friend is registered in a room contained on another sub-server. In such cases, conventionally, it would have been necessary for the player to select "exit" on screen M4 and once changeover to connection with the main server 1 had taken place, to select the other sub-server by using screen M3.

However, if changing of sub-server occurs frequently, there are the following problems. Specifically, connection requests to the main server 1 are limited to the number that can be processed at once by the capacity of the operating system (more generally, the software) of the main server 1. For this reason, if a number of connection requests exceeding the connection request processing capability of the main server are simultaneously concentrated on the main server 1, the main server 1 becomes unable to accept the connection requests, so the game device cannot connect to the main server 1.

Figure 15:
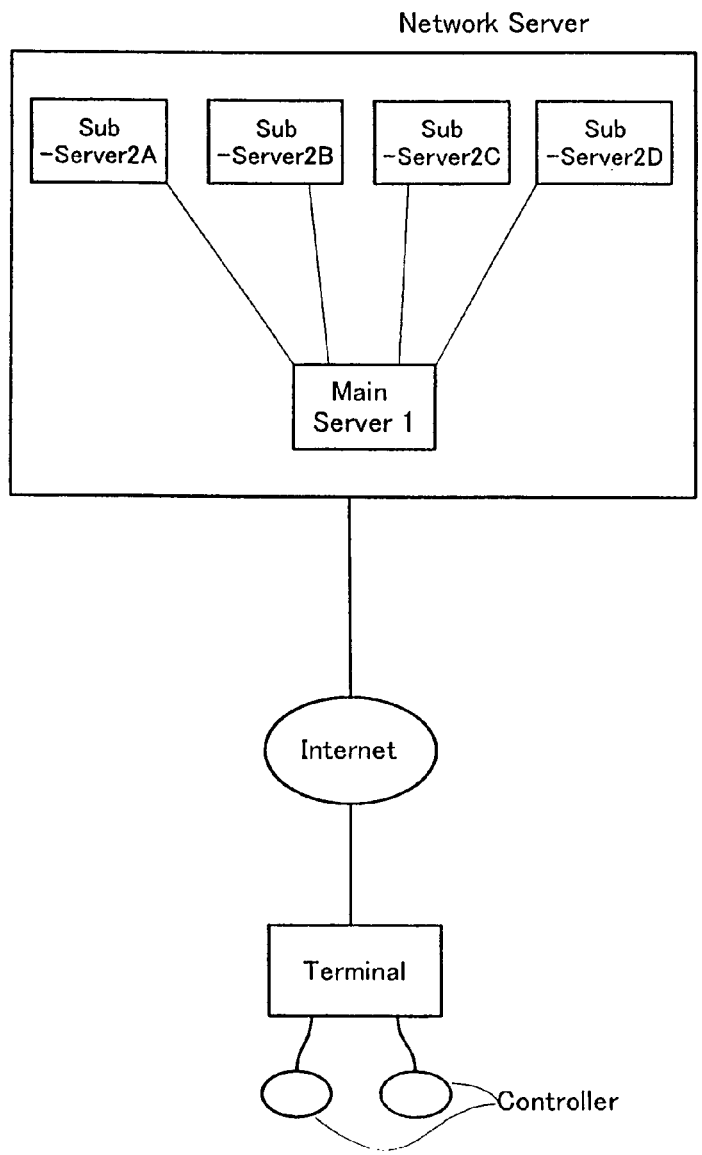
FIG. 15 is a block layout diagram of a prior art network server.

FIG. 15 is a block layout diagram of a prior art network server. In FIG. 15, conventionally, a plurality of sub-servers 2 are connected to a main server 1, and communicate their own information to the main server 1. However, there is no connection between the sub-servers 2, so the sub-servers 2 cannot acquire information relating to other sub-servers. Consequently, when changing over the sub-server to which a game device was connected, it was necessary to temporarily reconnect the game device to the main server. Thus, the conventional network server was of a construction in which connection requests were concentrated on the main server 1.

It is therefore desirable to reduce as far as possible that the number of connection requests to the main server 1. Accordingly, in this embodiment of the present invention, it is possible for the connection of the game device to be directly changed over to another sub-server from the sub-server to which it was connected previously. For this purpose, the network server in FIG. 11 is provided with a shared memory 3.

Shared memory 3 stores information relating to all of the sub-servers 2, such as the respective operating condition of the plurality of sub-servers 2, and the number of persons registered thereon etc. The information relating to the sub-servers 2 is periodically (for example every 0.5 second) updated by the respective sub-servers themselves.

Shared memory 3 can be accessed by the main server 1 and the plurality of sub-servers 2, respectively. The main server 1 reads information relating to all the sub-servers 2 from shared memory 3. Also, each sub-server 2 reads information relating to other sub-servers 2 than itself from shared memory 3. By providing shared memory that can be accessed from all the servers, it is arranged that the information of the other servers can be acquired without one-to-one connection of each server.

Figures 16, 17:
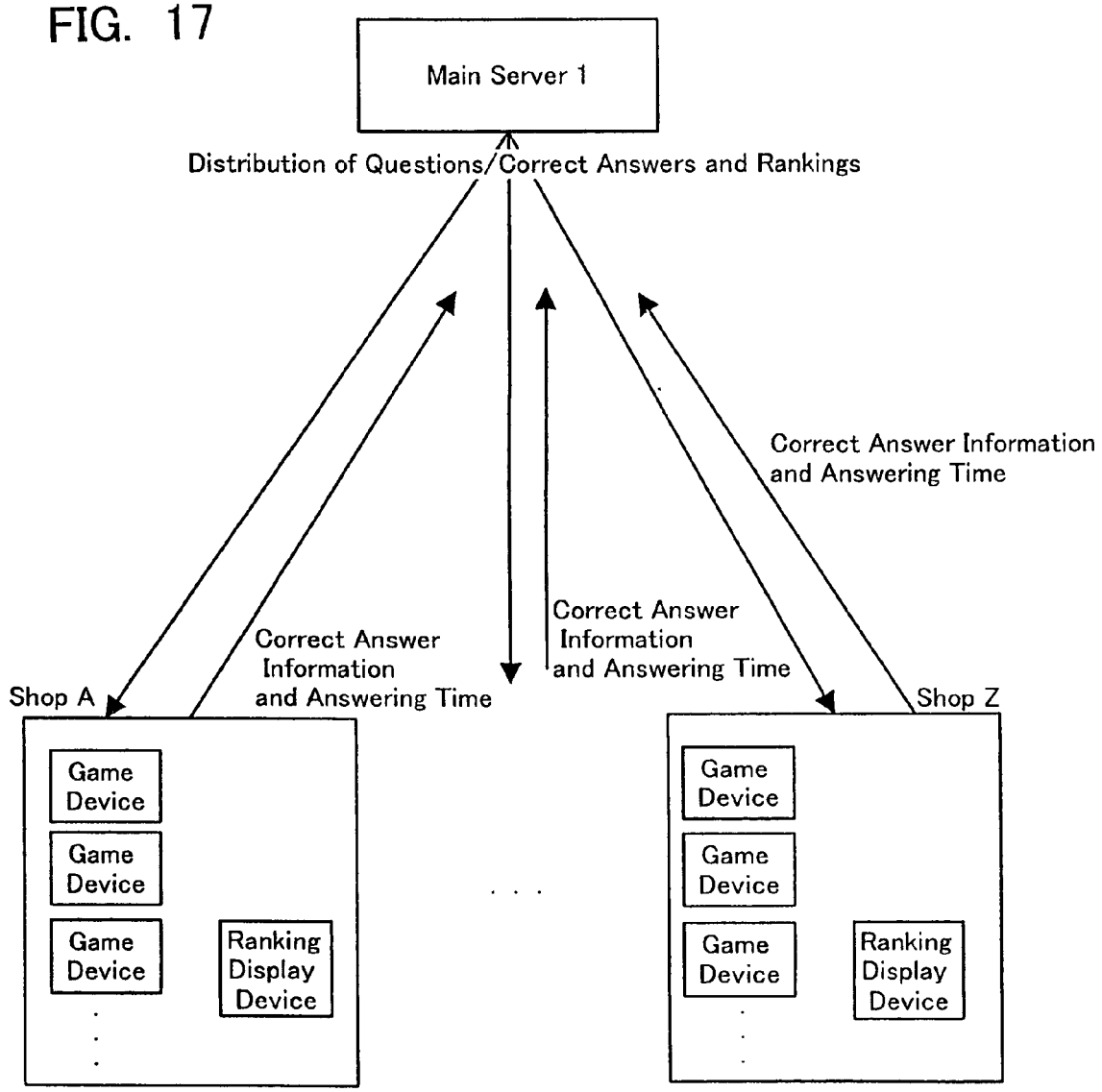
FIG. 16 is a diagram showing by way of example a region of a shared memory 3.
FIG. 17 is a view showing a network in which a plurality of game devices are connected through communication circuits to a main server.

FIG. 16 is a view showing diagrammatically the regions of the shared memory 3. As shown in FIG. 16, information relating to each sub-server 2 is stored for example in matrix condition. In FIG. 16, the four sub-servers 2a, 2b, 2c, 2d write the number of persons currently registered by themselves in their own row in respect of the columns of the other sub-servers. Thus, the sub-servers 2a, 2b, 2c, 2d read information regarding the other sub-servers that is written in their respective own column. Thus, since the ranges that are read by the respective sub-servers 2a, 2b, 2c, 2d are different, even when a plurality of sub-servers simultaneously access shared memory 3 for purposes of reading information, reading can be achieved simultaneously. Also, the main server 1 reads information relating to each sub-server from the main server 1 column of shared memory 3.

When information is read, the value of the region that was read becomes a value (for example "−1") to signify the read condition until it is updated to the next information. In this way, if, due to some fault, a sub-server is unable to write information, the region of shared memory 3 stays in the read condition. In this way, another server can recognize that this sub-server is malfunctioning.

Returning to FIG. 13, in screen M4, the item "move to another server" that is characteristic of the present invention is displayed. If this is selected, the selected sub-server 2 reads information relating to the other sub-server from its own column in shared memory 3 and communicates this to the game device. The information relating to the sub-server consists in information such as the name of the sub-server, its IP address, port number and number of persons registered, in the same way as described above. Each sub-server stores beforehand the information of the IP address and port number of the other sub-servers.

Next, the guide screen M4-1 of the other sub-server is displayed on the game device. On screen M4-1, the names of the other sub-servers apart from itself are displayed. When a player selects a single sub-server in the same way as in step S106 described above, a connection request is communicated to the selected sub-server using the selected sub-server's IP address and port number. Subsequent processing is executed in the same way as in FIG. 12.

In this way, by storing information relating to each sub-server and providing shared memory 3 that can be accessed by each sub-server, it is made possible for each sub-server to ascertain the condition of sub-servers other than itself. Consequently, since it is made possible for information relating to other sub-servers to be communicated to a game device from the sub-server to which it is currently connected, the connection of the game device can be directly changed over between sub-servers. Specifically, it becomes unnecessary to reconnect the game device to the main server 1, as was the case conventionally, so the number of connection requests to the main server 1 can be reduced. The likelihood that the main server 1 will receive connection requests exceeding its connection request acceptance capability is thereby reduced, so instances of a connection request from a game device being refused by the main server 1 can be practically eliminated. This contributes to improving the service to players utilizing the network.

Furthermore, even if the number of players participating in a network combat game from a single game server is more than one, there is a single connection between the game device and the network server i.e. a single socket is created. Consequently, as described above, the number of participants from a single game device is communicated beforehand to the network server (specifically, to the selected sub-server), and, as shown in FIG. 6, the data of the plurality of players is transmitted using a single socket, by a single data signal.

Although connections can be established (sockets created) corresponding to the number of the participants, this necessitates connection requests corresponding to the number of participants and so gives rise to problems regarding the capability of accepting connection requests, as described above. Consequently, according to the present embodiment, the load of connection request acceptance processing on main server 1 is reduced by employing a single connection (single socket) for the connection between a single game device and network server, irrespective of the number of participants from a single game device. The processing delay on the main server 1 can thereby be eliminated, contributing to an improved service.

Further Embodiment

Communication delay on the network also presents a problem in the following cases. For example, when a quiz game (hereinbelow called a network quiz game) between a plurality of players is played through the network, in some cases, in addition to the number of correct answers (or proportion of correct answers) ranking is determined taking into account the time to answer the quiz questions.

FIG. 17 is a view showing a network in which a plurality of game devices are connected through communication circuits to a main server. The communication time between the main server 1 and the individual game devices is respectively different depending on the geographical distance between the main server 1 and the individual game devices, the circuit condition (degree of interference), communication rate, and performance of the communication devices. Also, the game devices may be arranged in geographically separated manner. For example, at least one game device may be arranged at mutually geographically separated shop A, . . . , shop Z.

In the case of a network quiz game, a plurality of quiz questions included in constituting game information are distributed to each game device from a main server 1. The players answer the questions that are sequentially displayed on the screens of the game devices. The answers at the game devices are transmitted to the main server 1. Also, the correctness/incorrectness of the answers may be determined at the individual game devices and, in the event of a correct answer, information to this effect transmitted. The main server 1 determines the outcome and/or ranking accordance with the number of correct answers of the players (or the proportion of correct answers).

Let us now consider the case where a plurality of players have the same number of correct answers (or proportion of correct answers). A method which may be used in such cases is to compare the answering times for all the questions of the quiz game by each player, and to give the player whose answering time is shortest the highest ranking.

There is a problem that, when this answering time (response time) is measured by the main server 1, the correct answering time cannot be measured, because of discrepancies in the communication times on the network. The main server 1 measures as the answering time the time from the sending of the questions to the individual game devices up to the reception of the answer information or correct answer information from the individual game devices. In this case, if the communication times between the main server 1 and the individual game devices are all the same, the difference of the times of the aforementioned distribution between the game devices up to reception reflects the actual answering time from the display of the questions on the individual game devices up to when the players answer them.

However, since, as mentioned above, the communication times between the main server 1 and the individual game devices are respectively different, the times from the aforementioned distribution between each of the game devices to the reception thereof do not accurately reflect the actual answering time. It is possible to measure the communication time between the main server 1 and the individual game devices beforehand, but the possibility exists that this communication time may change during playing of the quiz game, due to changes of the congestion condition of the circuits. Thus, the answering time at each game device cannot be measured by the main server 1.

Accordingly, in this embodiment of the present invention, each game device itself measures the answering time of the questions and communicates this answering time to the main server 1 together with the answers or information as to their correctness/incorrectness. The answering time (response time) may, for example, be the time from commencement of reception or completion of reception of the quiz questions that are distributed from the server up to the commencement or completion of input of the answers by the player, or may be the time from when the player became able to answer (for example when the quiz question was displayed on the screen) up to the commencement or completion of input of an answer by the player.

Figure 18:
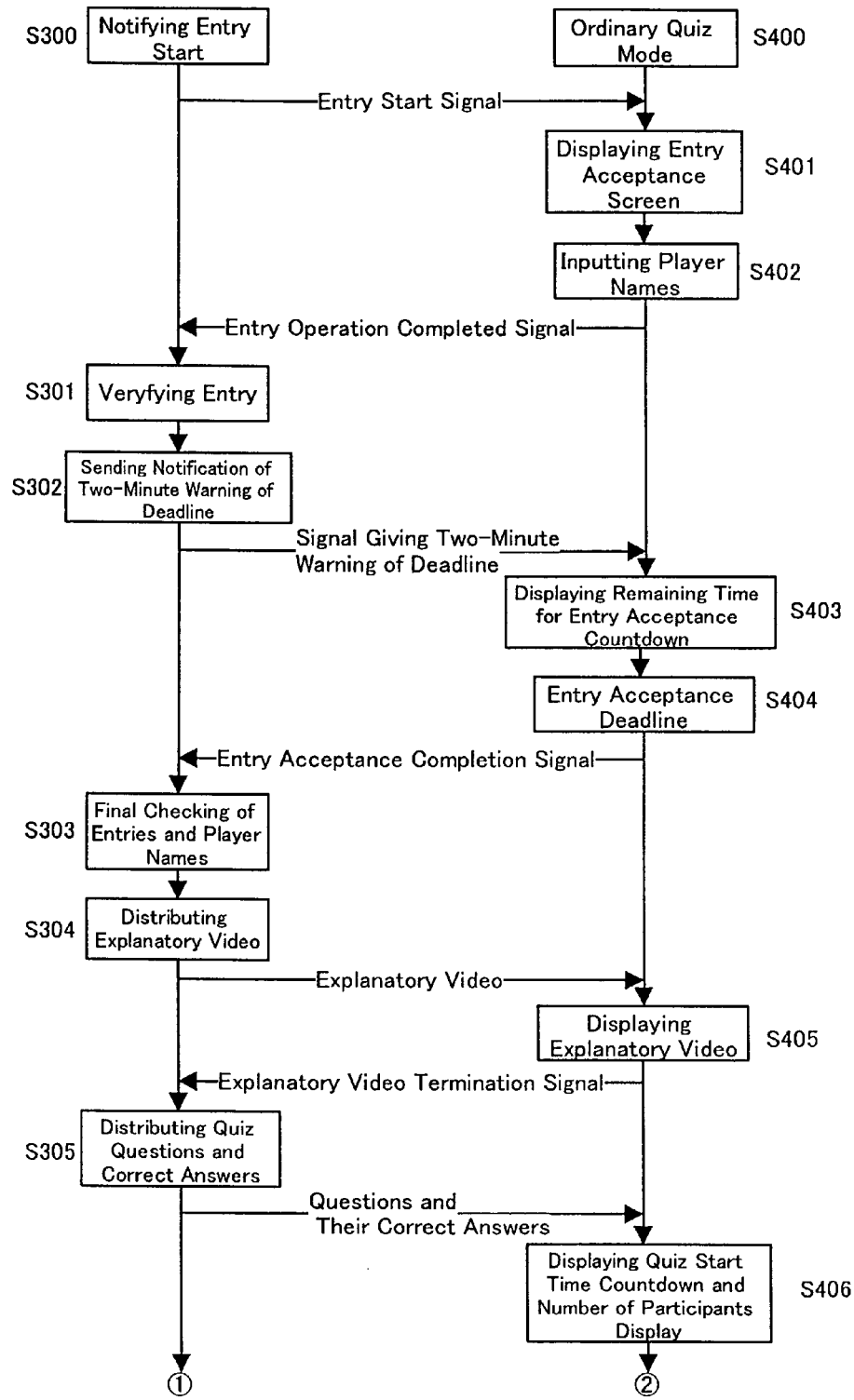
FIG. 18 is a flow chart of a network quiz game according to an embodiment of the present invention.
Figure 19:
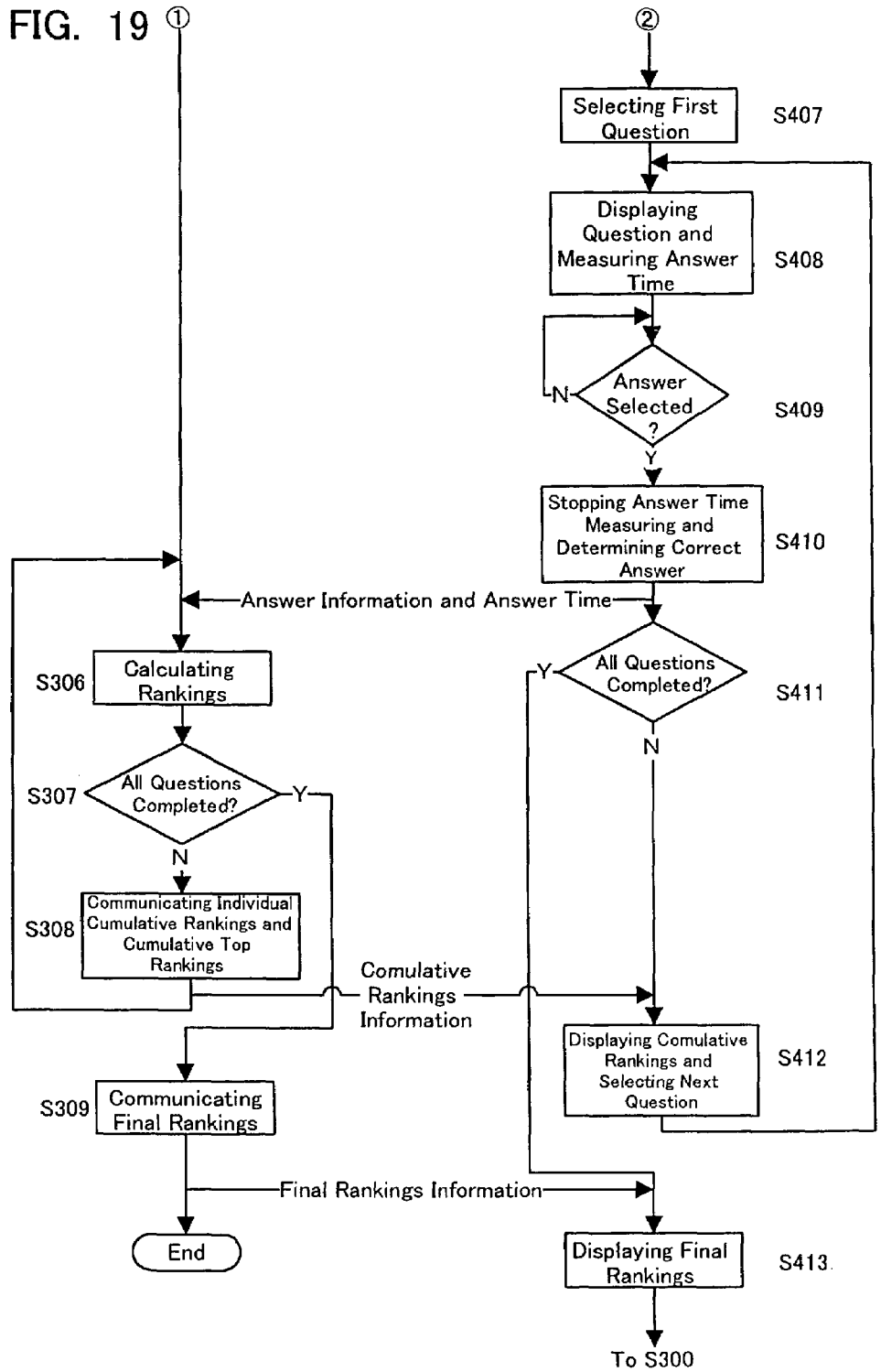
FIG. 19 is a flow chart of a network quiz game according to an embodiment of the present invention.

FIG. 18 and FIG. 19 are flow charts of a network quiz game according to an embodiment of the present invention. In FIG. 18, during the period while the network quiz game is not being executed, the game devices provide an ordinary quiz game at the individual game device units (S400(ordinary quiz mode)). That is, the players answer a prescribed number of quiz questions displayed on the game device, aiming at a correct answer rate that is as high as possible.

When a network quiz game is to be played, first of all, the main server 1 sends an entry commencement signal (S300) to the individual game devices, notifying them that a network quiz game will be commenced after a prescribed time. When the individual game devices receive the entry commencement signal, they display an entry acceptance screen (S401). When the game devices receive the entry commencement signal, if an ordinary quiz game is being played on the individual game device unit, changeover to the entry acceptance screen is effected as soon as this finishes.

Figure 20:
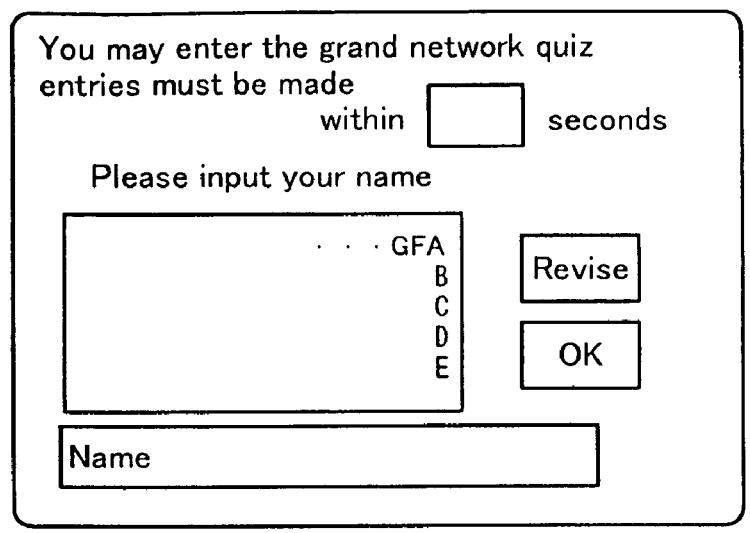
FIG. 20 is an example of an entry acceptance screen.

FIG. 20 is an example of an entry acceptance screen. A player wishing to participate in a network quiz game inserts coins to a prescribed sum and then inputs his/her name (S402) by selecting characters displayed on the entry acceptance screen. Where the screen of the game device is for example a touch panel, the player may select characters by touching the characters displayed. Or the player may select displayed characters using a control lever.

In FIG. 18, if the player enters his/her name before the entry acceptance deadline and selects the "end" button, the game device sends an entry operation completed signal to the main server 1. The entry operation completed signal includes for example the input player name, the information of the shop where the game device is provided, and game device identification information.

When the main server 1 receives the entry operation signal, it verifies the game device that makes the entry (S301). At a prescribed time (for example two minutes) before the entry acceptance deadline, it notifies each game device that the deadline is two minutes away (S302). When each game device receives the deadline two-minute warning signal, it displays a countdown of the remaining time up to the acceptance deadline on the entry acceptance screen of FIG. 20 (S403). Each game device, when the remaining time up to the entry acceptance deadline has expired, discontinues acceptance of entries (S404) and sends to the main server 1 an entry acceptance termination signal. Like the entry operation completed signal, the entry acceptance termination signal includes the name of the player making the entry, the information of the shop where the game device is provided, and game device identification information. If no entry is made, instead of the player name, the game device sends an entry acceptance termination signal including "no entry" information.

When the main server 1 has received a entry acceptance termination information from all the game devices, it separates, out of all the game devices, those game devices in respect of which an entry has been made, and carries out a final check of the player names and individual game devices in respect of which an entry has been made (S303). At this point, the main server 1 distributes to the game devices where there is an entry an explanatory video (S304) of the quiz game, using for this purpose a virtual master of ceremonies character. The individual game devices display the explanatory video (S405) and, when this is finished, send to the main server 1 an "explanation completed" signal.

When the main server 1 has received the "explanation completed" signal from all of the game devices where there is an entry, it starts the quiz. Specifically, if the total number of quiz questions is for example 30, the main server 1 first of all distributes (S305) all 30 questions and their correct answers to the respective game devices where there is an entry. The distribution from the main server 1 may be made simultaneously to all the game devices (or all the game devices where there is an entry), or may be made sequentially in time-divided fashion. In the case of sequential transmission, in response to reception of the "explanation completed" signal, the main server 1 may send the questions and their correct answers to the game devices that have transmitted this. It should be noted that, in addition to the questions and their correct answers, the number of participants is also notified to the game devices. Also, the questions and their correct answers may be distributed in time-division fashion. For example, first of all, the first 10 questions may be distributed, and then, before the first 10 questions have been completed, the next 10 questions may be distributed and, further, thereafter the final 10 questions may be distributed.

When the questions and their correct answers have been received, the game devices display a countdown of the time until the start of the quiz (for example 20 seconds) (S406). At this point, the number of participants is also displayed. The players can thereby ascertain the number of participants. When the quiz is started, the game device shifts to FIG. 19 and first of all selects the first question (S407).

Figure 21:
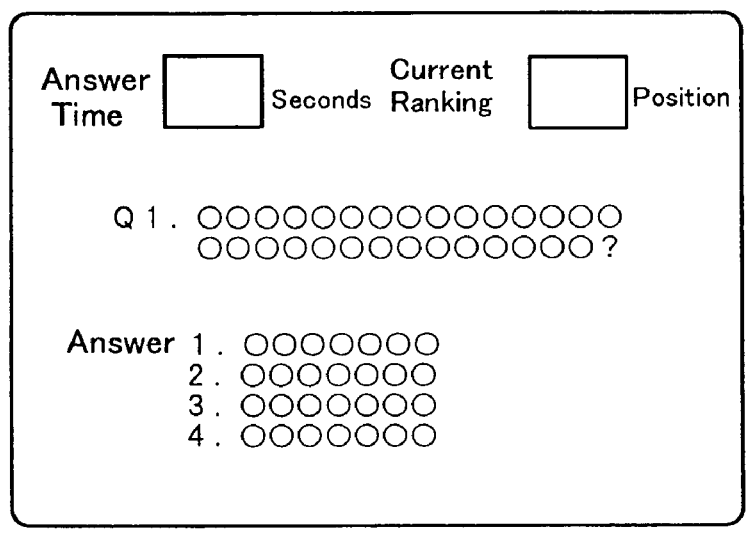
FIG. 21 is an example of a question display screen.

At this point, when the questions are displayed, the game device starts to measure the time using the timer, and measures the time taken until the answer is given (S408). The player gives the answer to the question by selecting one of a plurality of selection alternatives that are displayed. If the screen of the game device is a touch panel, the player touches the selected selection alternative. Alternatively, the selection alternative may be selected using a control lever. FIG. 21 shows an example of a question display screen.

When an answer is selected by the player (S409), the game device stops the time measurement, and obtains the answer time (S410). In addition, it determines whether the selected selection alternative is correct or not from the correct answer which was distributed (S410). If the answer is correct, a message to the effect that this is the correct answer is displayed on the screen, and answer information including the question number and the fact that the answer was correct are sent to the main server 1 together with the answer time that was obtained. Thus, in this embodiment of the present invention, since each game device measures the answer time and transmits this to the main server 1, even if the communication times between the main server 1 and the game devices are respectively different, the main server 1 can acquire a precise answer time for each game device.

On the other hand, in the event of an incorrect answer, a message to the effect that the answer is incorrect is displayed on the screen, and answer information including only the question number and the fact that the answer was incorrect is transmitted, without transmitting the answer time. Also, the case where no selection alternative was selected within the previously given prescribed time for answering one question (i.e. "time over") is regarded as an incorrect answer. It should be noted that the decision that an answer is correct could be made by the main server 1. In this case, the main server 1 transmits only the questions to the game devices and the game devices send to the main server 1, for each question, the selected answer and the answer time. The main server 1 makes the decision as to whether the answer that is received for each game device is correct/incorrect, and adds up the received answer times only in respect of the correct answers.

When the main server 1 receives the answer information (correct answer or incorrect answer) and the answer time in the case of a correct answer, it sums these, and calculates a ranking for each question (S306). If the number of correct answers is the same, it gives the highest ranking to a player whose total answer time is smallest. When the ranking is determined, the main server 1 communicates the individually obtained cumulative rankings to each game device (S308). Also, if a separate display device for displaying the rankings is provided in the shop where the game device is arranged (see the "ranking display device" of FIG. 17), main server 1 transmits for example the top-ranking 10 players and their cumulative ranking to the ranking display device. If the ranking display device is arranged in a position that is easily seen by the players operating the game devices, the players can ascertain their own ranking and, in addition, the names of the players in the top ranking position for each question.

When a game device receives the individual cumulative ranking from the main server 1, it displays this in the ranking display location of FIG. 21 and selects the next question (S412); the processing of the above-described S408 to S410 is repeated.

Also, in order to maintain the excitement in the quiz game, it may be arranged for example that the cumulative rankings are not transmitted in the final stage (last 10 questions) of the quiz game (calculation of the rankings is of course still performed). That is, during the performance, the rankings are not displayed. Also, in order to make possible a "comeback", the ranking may be determined with the count and/or the answer time allowed for a single correct answer doubled. Specifically, if the main server 1 normally (i.e. for questions other than the last 10 questions) increments the number of correct answers by 1 for the correct answer of one question, for correct answers to the last 10 questions it may increment the number of correct answers by a plurality of counts (for example 2 counts) per correct answer to a question. Also, the answer time for a correct answer may be multiplied by a prescribed factor (for example 2) before being added to the total of answer times up to this point. The difference of answer times is thereby made larger than in the ordinary case, making it easier for a comeback in ranking to be achieved.

When all the questions are finished (S307, S411), the main server 1 compiles the final rankings and communicates the individual final rankings to the individual game devices and furthermore communicates the names of the final top-ranking players and their ranking to the ranking display device (S309). The game devices display the final rankings (S413). It should be noted that it may be arranged for a performance video featuring a virtual master of ceremonies character (announcement of the top ranking players etc) to be distributed after completion of the quiz game, together with the transmission of the final ranking information. Also, separate videos may be distributed to the game devices of the top-ranking players and to the game devices of the other players. The game devices return to the ordinary quiz mode screen after the lapse of a prescribed time from the final ranking display.

For the method of determining ranking, apart from the method of, if the number of correct answers is the same, giving higher ranking to players whose total answer time is shortest, for example the method may be adopted of changing the number of points for correct answers in accordance with the answer time. For example, it may be arranged to decrease the number of points in accordance with the length of the answer time after display of the questions, such as 100 points if an answer is given within 5 seconds, 80 points if an answer is given within 10 seconds, and 60 points if an answer is given within 15 seconds. If this is done, the outcome and/or ranking is determined by the total of points.

As described above, in a quiz game through the network, the game devices calculate the answer time of the quiz questions, and send this to main server 1. In this way, even if the communication times between the main server and respective game devices are different, the main server that manages the quiz game can obtain the correct answer time for each question in each game device.

Also, the above embodiment can be applied to communication games other than network quiz games. For example, it can also be applied to games in which a competition is created regarding the response time until a player performs an input action requested by the game, such as a network challenge typing game, in which a plurality of players compete with regard to the speed with which they can actually input characters presented from the server, or a network challenge "mole-bashing" game, in which a plurality of players compete regarding the speed with which they can accurately perform an input operation presented by the server. In the case of a network challenge typing game, prescribed letters/symbols etc are distributed from the server as game information, and for example the response time from the point where it became possible for a player to perform an input operation corresponding to these distributed letters/symbols until the actual input operation is performed is measured. Also, in the case of a network challenge mole-bashing game, the positions where mole characters appear and disappear on the screen are distributed as game information and for example the response time from the appearance of a mole on the screen until the player performs an input operation corresponding to its position is measured. The measured response times are sent to the main server, where the outcome and/or ranking are calculated based on the total of the response times. In this case, highest ranking is obtained for the smallest total response time.

In the above, according to the present invention, when a computer game combat is carried out using a network having a communication delay, the delay times between the game devices are found before starting the game and, using these, synchronization of the times counted by the game devices is obtained. Then, during progress of the game, the operating data signals are processed after the lapse of the longest delay time after appearance thereof of the previously measured delay times between the game devices. In this way, the operating data signal can be processed simultaneously in a plurality of game devices.

Also, with the present invention, in a network server that manages a network game, the load on the main server that receives initial connection requests from the game devices can be made lighter.

Further, with the present invention, a plurality of players can participate in a network game from a single computer game device.

Further, with the present invention, in a communication game in which a plurality of players participate, when there is a competition as to the time until each player responds to the game information distributed from the server, the game devices operated by the individual players measure their response times and transmit these to the server; as a result, even when the distribution times of game information from the server to each game device are respectively different, the accurate response times can be found.

The range of protection of the present invention is not restricted to the embodiments described above but extends to equivalents of the invention as set out in the patent claims.

What is claimed is:

1. A network server connected to at least one client through a network, comprising:
    a main server for accepting an initial connection request from said client;
    a plurality of sub-servers connected to said client after acceptance by said main server, and
    a memory remotely connected with said main server and sub-servers, that stores information relating to the sub-servers, the information including a number of players registered to each sub-server;
    wherein said main server accesses said memory to obtain the information relating to the sub-servers and provides to said client information relating to the sub-servers on acceptance of an initial connection request from said client; and
    said client is connected with one sub-server based on said information relating to the sub-servers;
    said one sub-server accesses said memory to obtain the information relating to the sub-servers except said one sub-server itself and provides directly to said client said information relating to the sub-servers except said one sub-server without intervention by said main server on acceptance of a sub-server connection alteration request from said client; and
    said client alters a connection with another sub-server from a connection with said one sub-server without intervention by said main server based on said information relating to the sub-servers,
    wherein each of sub-servers writes its own information to said memory.

2. The network server of claim 1, wherein the client is a game apparatus with which a plurality of controllers for inputting a signal corresponding to operations of players can be connected, in case that a network game is played between a plurality of the game apparatuses via the network server,
    the game apparatus determines the number of players who participate on the network game by the player's operation of the controller,
    the game apparatus sends information of the number of the players to the sub-server connected with the game apparatus,
    the information of the number of the players is stored in the sub-server connected with the game apparatus.

3. A network system comprising:
    at least one client; and
    a network server including a main server that accepts an initial connection request from said client and a plurality of sub-servers connected to said client after acceptance by said main server, and a memory remotely connected with said main server and sub-servers, that stores information relating to the sub-servers, the information including a number of players registered to each sub-server;
    wherein said main server accesses said memory to obtain the information relating to the sub-servers and provides to said client information relating to the sub-servers on acceptance of an initial connection request from said client;
    said client is connected with one sub-server based on said information relating to the sub-servers;
    said one sub-server accesses said memory to obtain the information relating to the sub-servers except said one sub-server itself and provides directly to said client said information relating to the sub-servers except said one sub-server without intervention by said main server on acceptance of a sub-server connection alteration request from said client; and
    said client alters a connection with another sub-server from a connection with said one sub-server without intervention by said main server based on said information relating to the sub-servers except said one sub-server.

4. The network system of claim 3, wherein the client is a game apparatus with which a plurality of controllers for inputting a signal corresponding to operations of players can be connected, in case that a network game is played between a plurality of the game apparatuses via the network server,
    the game apparatus determines the number of players who participate on the network game by the player's operation of the controller,
    the game apparatus sends information of the number of the players to the sub-server connected with the game apparatus,
    the information of the number of the players is stored in the sub-server connected with the game apparatus.

* * * * *